UNITED STATES PATENT OFFICE 2,162,616

PROCESS FOR THE MANUFACTURE OF ARTIFICIAL RESINS

Willy O. Herrmann, Deisenhofen, and Hans Deutsch and Bruno von Zychlinski, Munich, Germany, assignors to Chemische Forschungsgesellschaft, m. b. H., Munich, Germany No Drawing. Application May 13, 1936, Serial No. 79,615. In Germany December 22, 1934

11 Claims. (Cl. 260—67)

This invention relates to synthetic resins and, more particularly, to aldehyde resins of the type formed by condensation and/or polymerization of one or more aldehydes.

It has been found that improved synthetic resins may be produced by condensing or polymerizing aldehydes to form highly molecular products, and subjecting the same to reduction during or subsequent to the condensation.

The process of the invention is applicable to the resinification of aliphatic, aromatic, hydroaromatic, saturated and unsaturated aldehydes, as, for example, acetaldehyde and its polymers, aldol, crotonaldehyde, butyraldehyde, glyceric aldehyde, acrolein, benzaldehyde, cinnamic aldehyde, phenyl acetaldehyde, etc. The synthetic resins produced according to the invention are, in comparison with the synthetic resins manufactured according to processes employed heretofore, characterized by improved clarity with little or no color, by increased hardness, elasticity, temperature stability, capability of being polished, fusibility, solubility, (particularly in oils), and by exceptional adaptability for combining with other organic compounds to produce resins of modified characteristics. The new synthetic resins of the invention can be utilized advantageously in all types of spirit and oil varnishes, in the dye industry and in the production of pressed and spray-cast articles, particularly in the manufacture of gramophone records.

The condensation or polymerization of the aldehydes may be effected in any desired manner. Under certain circumstances the aldehyde, for example crotonaldehyde, may be resinified by thermal treatment. The condensation may be effected by the action of dehydrating agents such as, for example, calcium chloride, anhydrous sodium sulphate, copper sulphate, calcined gypsum or lime; or of ammonia, aliphatic or aromatic amines, alkalies, alkaline earths or their salts with weak acids, for example carbonates or acetates; or by the action of acids such as, for example, hydrochloric acid, phosphoric acid, sulphuric acid, sulphurous acid, trichloracetic acid, organic sulphonic acids and the like, or of acid salts. Various combinations of these condensing agents may also be employed. In particular, it is generally advantageous to supplement the condensing action of chemical condensing agents with thermal condensation. Also, various aftertreatments may be employed such as esterification, chlorination, sulphonation, vulcanization, ozonization, and the addition of compounds capable of forming addition compounds, such as ethylene oxide, unsaturated dicarboxylic acids and the like.

The reducing treatment may be started at any desired stage of the process of manufacture. The reduction is effected by the action of nascent hydrogen, such as may be formed by the reaction of zinc or aluminum with organic or inorganic acids or with alkalies, or by the reaction of silicon with alkalies, or by electrolytic action; also by the action of molecular hydrogen which has been suitably activated as by a catalyst such as finely divided nickel.

In general it is advisable to carry out the condensation process, or certain stages of it, under mild conditions. This applies particularly to the initial stages. To provide such mild conditions, the temperature of reaction is preferably kept low, e. g. below 15° C., and under certain circumstances at about 6° C. Furthermore, it may be of advantage to use condensing agents having only a mild condensing action. As condensing agents for this purpose may be mentioned particularly weakly alkaline or weakly acidic substances, such as sodium carbonate, sodium acetate, borax, hydroxides of the alkaline earths, pyridine, aluminum acetate, sodium acid sulphate, trichloracetic acid, formic acid, etc., as well as neutral dehydrating substances. However, strong alkalies or bases having a strongly condensing effect such as pyridine and aniline; or strong acids may also be used if the concentrations and quantities thereof are suitably regulated.

A further variation of the procedure of the invention consists in carrying out the condensation reaction in a plurality of steps, each of which may be suitably regulated to produce the desired effect. Thus, an optimum production of a synthetic resin of any desired special properties may be obtained by suitable regulation of the temperatures, concentrations, solvents and other additions in the various steps of the process. The development of the desired properties can be further regulated by the addition of the aldehyde or of the basic, acid or neutral condensing agents at different stages of the reaction. For instance, the greater part of the quantity of aldehyde to be condensed may be first allowed to flow into a solution of soda, the condensation continued until two layers are formed, and then the rest of the aldehyde added. Under certain circumstances the aldehyde may be dissolved in a solvent such as spirit, benzol, acetone, acetic acid or the like.

Furthermore, a mixture of several different aldehydes, for example acetaldehyde and formaldehyde, or benzaldehyde and crotonaldehyde, can also be condensed or the condensation may be started with one aldehyde and one or several other aldehydes may be added after the condensation has become more or less advanced.

Special effects may also be obtained by first condensing a plurality of mixtures of reactants to a greater or less degree under different conditions and subsequently gradually mixing them in one working step. The individual reaction mixtures may be prepared from different aldehydes and, under certain circumstances, with the addition of different substances which may take part in the reaction. Such substances may themselves be condensed to a greater or less extent and they may be entirely or partially reduced or nonreduced. By the combination of different reaction mixtures as has been indicated above, resin bodies of great adaptability and reduced resins meeting the most varied demands are obtained.

Modification of the synthetic resins of the invention may be further effected by the addition thereto of non-aldehydic organic substances which may be incorporated therein at any stage of the aldehyde reaction or reduction. For instance, may be mentioned such compounds as monomeric and polymeric acetals; polymerizable unsaturated organic compounds, particularly vinyl compounds, such as the esters, acetals, and ethers of vinyl alcohol, acrylic acid, methacrylic acid and its derivatives, and the corresponding polymerized vinyl compounds, particularly polyvinyl alcohol; ethylene oxide; unsaturated dicarboxylic acids and the like; phenols, organic bases, ureas, and more or less highly molecular condensation products of these substances with aldehydes, particularly with formaldehyde and acetaldehyde; polybasic organic acids or their condensation products with alcohols or phenols; sugar, glycols, glycerine; fatty oils, particularly unsaturated oils containing hydroxy groups such as China-wood oil, castor oil, aleuritic acid and the like, or the corresponding acids; also, sulphonic acids, Turkey red oil and the like.

Inorganic substances may also be incorporated or brought into reaction at any stage of the aldehyde reaction or during the reduction or in an after-treatment. For example, a hardening effect may be obtained by the incorporation of colloidal aluminum oxide at the time of reduction of the resin with aluminum in an alkaline medium; or sulphur may be introduced during a subsequent thermal hardening treatment.

There may be incorporated in the resin at any stage of its manufacture pulverant or fibrous organic or inorganic fillers, coloring agents, pigments, softening agents, or other conventional additions. Special mention may be made of the exceptional adaptability of the resins of the invention being combined, not only with castor oil, aleuritic acid and the like, but also with linseed oil, waste oil and the like. In this manner high grade oil varnishes of a new character are produced. Finally, the resins of the invention are particularly adaptable for modification by the addition thereto of materials which affect their mechanical properties or their colloidal behavior in the solid, liquid or dissolved state. Thus, incorporation of metal oxides, such as magnesia or aluminum oxide, increases the hardness of the resin while incorporation of boric acid and the like produces highly viscous solutions. Incorporation of waxes or wax-like substances increases the hardness of the resin and at the same time promotes hardening by thermal treatment.

The invention is further illustrated by the following specific examples.

*Example I*

To 250 parts by weight of a 20% solution of sodium carbonate were gradually added 400 parts by weight of acetaldehyde. The addition took place over a period of ½ hour, during which time the reaction mixture was stirred. During the period of addition and for a further period of ½ hour, the temperature of the reaction mixture was maintained between 0 and 10° C. Thereupon, the temperature was increased gradually until a soft resin layer separated. The mixture was then again cooled to below 10° C. and a mixture of 120 parts by weight of acetaldehyde and 250 parts by weight of acetic acid was added, whereupon the reaction mixture was boiled (the boiling point being approximately 100° C.) for a few hours and then allowed to stand for a few hours longer at ordinary temperature. Then 50 parts by weight of zinc powder were added with slight warming, and the mixture heated for a few hours. Finally, two further additions of 10 parts by weight of zinc powder were made, the mixture being heated for a short time after each addition. After adding water, the resin was dissolved in ethyl acetate and the solution thus obtained was freed from volatile constituents by distillation. After the distillation temperature exceeded 100° C. the distillation was carried out in a vacuum up to a temperature of 180° C.

The resin thus obtained is easily fusible, can be rolled into sheets which are as clear as glass and of a light amber color and which possess great hardness in addition to satisfactory elasticity. It dissolves in spirits more readily than natural shellac and forms a solution which, in 15% concentration, is of about the color of white wine. The resin is better suited for polishing than natural shellac. At the same time, the amount of oil necessary to use with the resin is extremely low and films formed therefrom may be polished more rapidly and satisfactorily than is the case with natural shellac. The shade of even the lightest natural wood is preserved, which is not the case even with lemon-shellac. The durability of polished layers of the resin is very satisfactory.

The procedure given in the above example is only illustrative of one method of carrying out the invention and may be varied to produce different results in accordance with the principles disclosed hereinabove. In particular, it may be noted that, in the reduction with zinc, the acetic acid may be replaced by alcoholic hydrochloric acid or the like.

*Example II*

20 parts by weight of the synthetic resin of Example I were heated with 80 parts by weight of waste oil for ½ hour, the mixture being stirred during the heating operation. After standing for three days, the product was decanted from a small amount of sediment which had been formed, was diluted with 50% turpentine oil, 4% siccative added and the resultant solution filtered in the usual manner. The resultant product is a colorless and perfectly clear oil varnish which is easily applied and produces high grade coats of varnish.

*Example III*

400 parts by weight of acetaldehyde were flowed into 250 parts by weight of a 20% solution of sodium carbonate with stirring of the mixture. During the course of the addition the temperature was maintained at 0–10° C. and for a further period of ½ hour was maintained at 10° C. Thereupon the mixture was heated until it separated into two layers, whereupon 80 parts by weight of vinyl acetate were added and the mixture heated for one hour to a temperature of about 60° C. Thereupon 50 parts by weight of zinc powder and 200 parts by weight of acetic acid were introduced. Finally the mixture was boiled for two hours. The further treatment of the mixture was carried out in the same way as described in Example I. The synthetic resin thus produced possesses properties similar to that manufactured according to Example I.

In the appended claims the expressions "inter-condensing", and "inter-condensation" are used to denote the condensation and/or polymerization of aldehydes with the same or with different aldehydes, as distinguished from the condensation of aldehydes with non-aldehydic compounds such as phenols, urea and the like.

We claim:

1. A process which comprises inter-condensing aldehyde by subjecting the same to the action of a condensing catalyst at a temperature not substantially exceeding 100° C. to form a resinous product and then hydrogenating said resinous product.

2. A process which comprises inter-condensing aldehyde by subjecting the same to the action of a condensing catalyst at an initial temperature below about 15° C., then at a temperature above 15° C. but not substantially exceeding 100° C. to form a resinous product and then hydrogenating said resinous product.

3. A process which comprises inter-condensing aldehyde by subjecting the same to the action of an alkaline condensing catalyst at a temperature not substantially exceeding 100° C. to form a resinous product and then hydrogenating said resinous product.

4. A process which comprises inter-condensing aldehyde by subjecting the same to the action of an alkaline condensing catalyst at an initial temperature below about 15° C., then at a temperature above 15° C. but not substantially exceeding 100° C. to form a resinous product and then hydrogenating said resinous product.

5. A process which comprises inter-condensing acetaldehyde by subjecting the same to the action of a condensing catalyst at a temperature not substantially exceeding 100° C. to form a resinous product and then hydrogenating said resinous product.

6. A process which comprises inter-condensing acetaldehyde by subjecting the same to the action of a condensing catalyst at an initial temperature below about 15° C., then at a temperature above 15° C. but not substantially exceeding 100° C. to form a resinous product and then hydrogenating said resinous product.

7. A process which comprises inter-condensing acetaldehyde by subjecting the same to the action of an alkaline condensing catalyst at a temperature not substantially exceeding 100° C. to form a resinous product and then hydrogenating said resinous product.

8. A process which comprises inter-condensing acetaldehyde by subjecting the same to the action of an alkaline condensing catalyst at an initial temperature below about 15° C., then at a temperature above 15° C. but not substantially exceeding 100° C. to form a resinous product and then hydrogenating said resinous product.

9. A process which comprises inter-condensing acetaldehyde by subjecting the same to the action of sodium carbonate as a condensation catalyst at an initial temperature below about 15° C., then at a temperature above 15° C. but not substantially exceeding 100° C. to form a resinous product and then hydrogenating said resinous product by the action of nascent hydrogen.

10. An aldehyde resin comprising the hydrogenated inter-condensed aldehyde product prepared by the process of claim 1.

11. An aldehyde resin comprising the hydrogenated inter-condensed acetaldehyde prepared by the process of claim 5.

WILLY O. HERRMANN.
HANS DEUTSCH.
BRUNO v. ZYCHLINSKI.